June 9, 1936.　　　H. F. VICKERS　　　2,043,453

LIQUID RELIEF VALVE

Filed July 23, 1931　　　2 Sheets-Sheet 1

INVENTOR.
HARRY F. VICKERS.
BY Barnes & Kissell
ATTORNEYS

June 9, 1936. H. F. VICKERS 2,043,453
LIQUID RELIEF VALVE
Filed July 23, 1931 2 Sheets-Sheet 2

INVENTOR.
HARRY F. VICKERS.
BY Barnes & Kissell
ATTORNEYS

Patented June 9, 1936

2,043,453

UNITED STATES PATENT OFFICE 2,043,453

LIQUID RELIEF VALVE

Harry F. Vickers, Detroit, Mich.

Application July 23, 1931, Serial No. 552,692

7 Claims. (Cl. 137—53)

This invention relates to liquid relief valves, and more particularly to a balanced relief valve for accurately controlling the pressure limits.

Heretofore, in the manufacture of standard relief valves, it has been the practice to directly back the main control valve with spring means of a predetermined strength, with the result that the opening of the valve meant an added resistance because of the accumulated resistance in compressing the control spring. Such structure has not only resulted in inaccuracy and inefficiency, in this type of valve, but has been partly responsible for the disturbing and wear producing chattering in such standard type of valves. This chatter has produced an undesirable vibration in the operation of many machine tool elements due to the water hammering action produced by the chatter. In general, all standard type relief valves, with which I am familiar, will chatter at some pressure, and when the valve operates at this pressure the vibration produces a noise or squeal which is quite disturbing and often unbearable. The destructive action upon the valve and valve seat caused by this chatter has heretofore required frequent replacement of the valve parts.

It is the object of the present invention to provide a pressure limiting and controlling valve which will not chatter or vibrate due to pressure surges and which will control the pressure in the system within very close limits. Other objects and features reside in the simple and compact structure of the valve unit, the manner of balancing the valve and the piston construction therefor, whereby to obtain great accuracy and provide for a full opening of the valve with a very small change in pressure. Still further features reside in the peculiar shape of the valve itself and the general arrangement and assembly of the various parts whereby to obtain a smooth working action.

Figure 4:
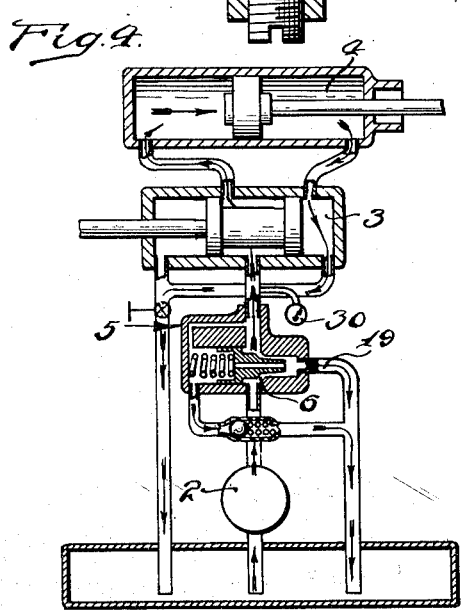
Fig. 4 is a diagrammatic view illustrating one manner of embodying my relief valve in a simple hydraulic circuit.

My novel relief valve may be installed in any pipe line containing liquid which is subject to pressure. Referring to Fig. 4, as showing a simple standard circuit, it will be seen that a pump 2 of any desired capacity will deliver liquid from the tank to the control valve 3 for operation of the motor 4. The exact pressure at which the liquid is delivered to the control valve and the motor may be determined by means of my relief valve which may be designated 5. This relief valve may be inserted as shown in the same position and in the same manner as any standard relief valve, the only distinction being that one T is eliminated together with several pipe connections.

Figure 1:
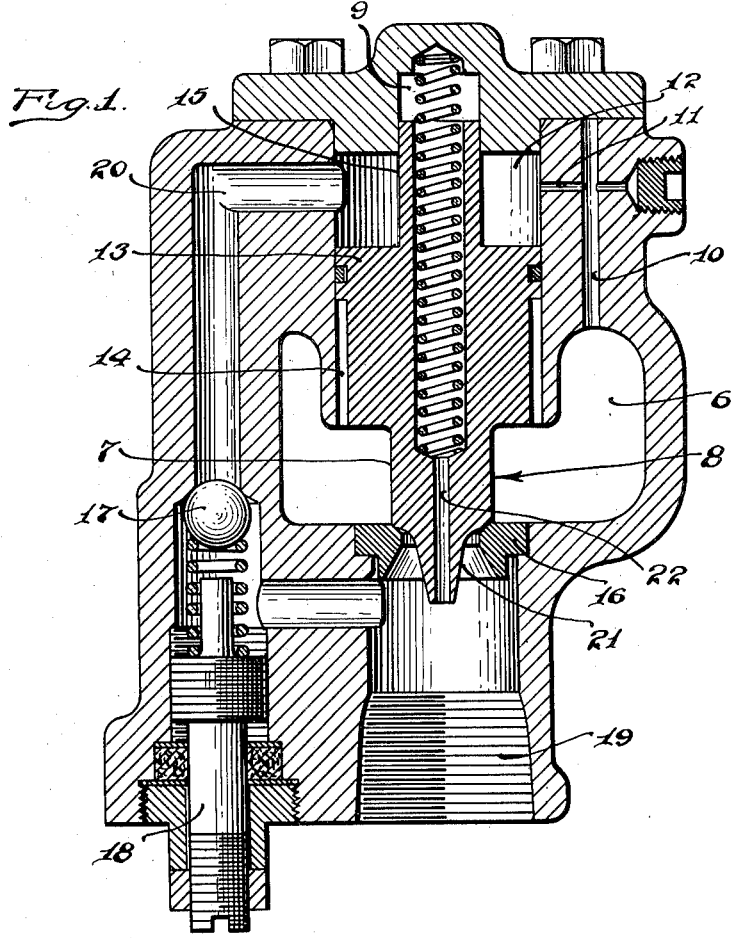
Fig. 1 is a longitudinal sectional view through a balanced relief valve constructed in accordance with the present invention.
Figure 2:
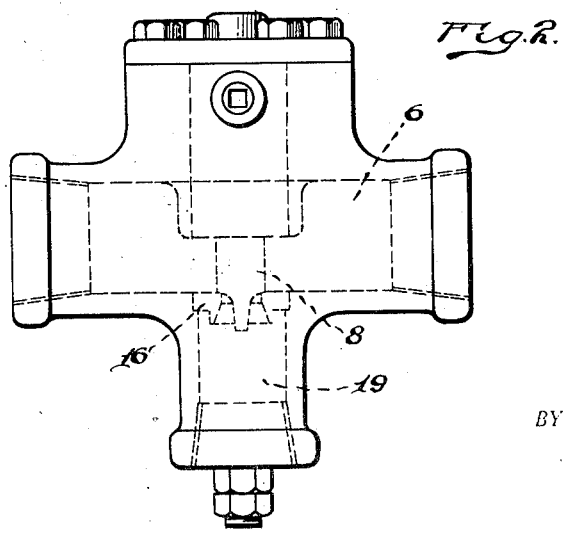
Fig. 2 is a front elevation thereof.
Figure 3:
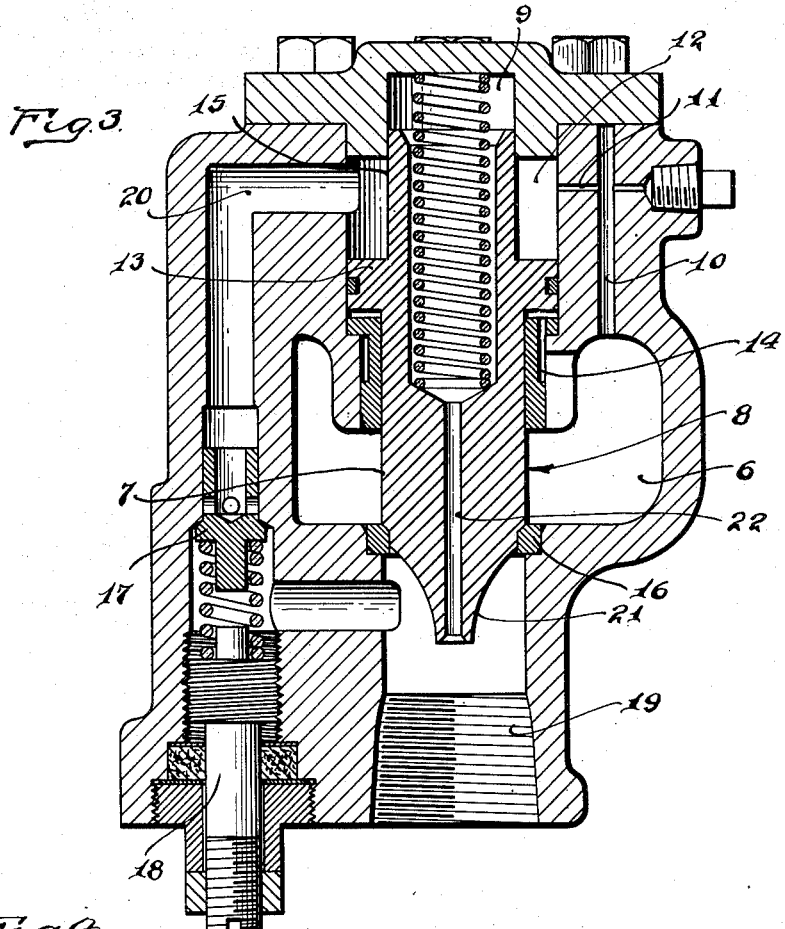
Fig. 3 is a sectional view similar to Fig. 1 but illustrating slightly modified details in some of the parts thereof.

Referring more particularly to Fig. 1, the liquid normally flows into the chamber 6 in the direction indicated by the arrow, and thus flows around the stem 7 of the main control valve which may be generally designated 8. This control valve 8 is in inoperative position held upon its seat by a relatively weak spring 9.

Liquid entering the chamber 6 also flows through a passageway 10 and an orifice 11 to a chamber 12 formed within the valve casing by reason of the piston 13. In the construction shown in Fig. 1, suitable grooves 14 are provided for insuring the application of pressure to the entire bottom area of the piston 13, but it will be understood that said piston may be continued down to a point adjacent the stem 7.

As pressure is built up in the chambers 6 and 12, opposing forces are exerted upon the piston 13, and inasmuch as the upper area of the piston 13 minus the area of guide 15 is greater than the bottom area of the piston 13 minus the area of the stem 7, the greater force of the liquid is downward tending to seat the valve 8 more firmly against the valve seat 16.

A control valve 17 for determining the relief pressure is in the form of a spring pressed ball or valve backed by an adjustable member 18 for controlling the pressure of the spring, and is positioned between the chamber 12 and the exhaust passageway 19. A relatively large passageway 20 connects the chamber 12 with the control valve 17.

With the pump 2 in operation and liquid flowing through the chamber 6 of the relief valve, the spring pressure upon the ball 17 may be regulated to give the desired pressure at which the system is to operate, say, for instance, five hundred pounds. When the pressure on the control valve 17 exceeds this adjusted pressure, the control valve ball will move downwardly permitting the liquid to flow to the liquid return passageway 19. As the diameters of the valve 17 and the passageway 20 are relatively greater than the small orifice 11, the escapement of liquid takes place more rapidly through the passageway 20 than it can be replaced through the orifice 11, thus preventing a further pressure rise in the chamber 12. The result of this action is that the downwardly exerted force of the liquid on the piston 13 immediately becomes less than the upwardly exerted force by the incoming liquid under pressure so that the piston will immediately move upwardly and unseat the valve 8, permitting liquid to escape from the chamber 6 into the discharge passageway 19 until a pressure balance is again obtained between the chambers 6 and 12, at which time the valve will again be seated due to the differential in area between the upper and lower ends of the piston 13.

The large effective area of the piston 13 makes for very great accuracy whereby to give a full opening of the valve with a very small change in pressure above the pressure at which the relief valve is set.

The end of the valve 8 preferably terminates in an inwardly and downwardly converging portion 21 which is designed to materially dissipate the energy of the oil or liquid flowing past the valve so as to positively prevent any chattering or vibration. An axial passageway 22 throughout the valve and terminating adjacent the inwardly tapered end of the valve results in an ejector effect and the producing of a vacuum which may be utilized for various purposes such as the constant drainage of the chamber above the guide 15 or for supplying a constant vacuum to a stuffing box of hydraulically operated units to prevent leakage and dripping of oil between the relatively movable parts thereof.

What I claim is:

1. A balanced relief valve for liquid pressure systems, comprising a liquid return conduit, a housing provided with a chamber for conducting the main flow of liquid, a liquid pressure valve for controlling the flow of liquid from said main chamber to the return conduit, said valve being cylindrical and adapted to contact with a seat formed in the liquid return conduit, a differential piston connected to but spaced from said valve and serving as the principal means for actuating the same in two directions, a pressure chamber at the end of the piston remote from the valve, an extension on said piston of substantially the same diameter as said valve and extending from the piston through the pressure chamber to substantially balance the operating areas on opposite sides of the piston, a chamber in said housing for permitting movement of said extension, a restricted conduit for conducting liquid under pressure to said pressure chamber, and a relatively large conduit connecting said pressure chamber to an auxiliary relief valve subject to the pressure in said pressure chamber for controlling the operation of said piston to in turn control the opening and closing of said main control valve.

2. In a relief valve for hydraulic systems, a housing having a main flow passageway and an exhaust outlet forming a valve seat, a piston operated valve cooperating with said seat, the portion of the valve immediately above the seat being cylindrical and terminating in a relatively large piston spaced from said valve seat, a pressure chamber formed at the end of the piston opposite the valve, an extension on said piston of substantially the same diameter as said valve and extending from the piston through the pressure chamber tending to balance the operating areas on opposite sides of the piston, a chamber formed in the housing for receiving said extension, a relatively light spring tending to retain the valve against the valve seat, a restricted conduit for connecting the main flow passageway with said pressure chamber, and a pilot relief valve connected by means of a relatively large conduit with said pressure chamber to prevent rise of pressure on one side of said piston above a predetermined value.

3. A balanced relief valve for liquid pressure systems, comprising a liquid return conduit, a housing provided with a chamber for conducting the main flow of liquid, a liquid pressure valve for controlling the flow of liquid from said main chamber to the return conduit, said valve being cylindrical and adapted to contact with a seat formed in the liquid return conduit, a differential piston connected to but spaced from said valve and serving as the principal means for actuating the same in two directions, a pressure chamber at the end of the piston remote from the valve, an extension on said piston of substantially the same diameter as said valve and extending from the piston through the pressure chamber to substantially balance the operating areas on opposite sides of the piston, a chamber in said housing for permitting movement of said extension, a restricted conduit for conducting liquid under pressure to said pressure chamber, a relatively large conduit connecting said pressure chamber to an auxiliary relief valve subject to the pressure in said pressure chamber for controlling the operation of said piston to in turn control the opening and closing of said main control valve, and a conduit for connecting said chamber at the end of the extension to said liquid return conduit.

4. In a relief valve for hydraulic systems, a housing having a main flow passageway and an exhaust outlet forming a valve seat, a piston operated valve cooperating with said seat, the portion of the valve immediately above the seat being cylindrical and terminating in a relatively large piston spaced from said valve seat, a pressure chamber formed at the end of the piston opposite the valve, an extension on said piston of substantially the same diameter as said valve and extending from the piston through the pressure chamber tending to balance the operating areas on opposite sides of the piston, a chamber formed in the housing for receiving said extension, a restricted conduit for connecting the main flow passageway with said pressure chamber, a pilot relief valve connected by means of a relatively large conduit with said pressure chamber to prevent rise of pressure on one side of said piston above a predetermined value, and a conduit extending through said valve piston and extension for connecting the extension receiving chamber with the exhaust outlet.

5. In a relief valve for hydraulic systems, a housing having a main flow passageway and an exhaust outlet forming a valve seat, a piston operated valve cooperating with said seat, the portion of the valve immediately above the seat being cylindrical and terminating in a relatively large piston spaced from said valve seat, a pressure chamber formed at the end of the piston opposite the valve, an extension on said piston of substantially the same diameter as said valve and extending from the piston through the pressure chamber tending to balance the operating areas on opposite sides of the piston, a chamber formed in the housing for receiving said extension, a restricted conduit for connecting the main flow passageway with said pressure chamber, a pilot relief valve connected by means of a relatively large conduit with said pressure chamber to prevent rise of pressure on one side of said piston above a predetermined value, said piston valve terminating in a tapering portion of smooth contour extending past the valve seat to dissipate the energy of the liquid and reduce chattering and vibration, said extension and piston being hollow, and a conduit opening in the tapered portion of the piston valve whereby to produce a partial vacuum within the hollow portion of the piston and extension.

6. In a relief valve for hydraulic systems, a housing having a main flow passageway and an exhaust outlet forming a valve seat, a piston operated valve cooperating with said valve seat, said valve being cylindrical from the point of contact with said seat to said piston, a pressure chamber on the other side of said piston, a guide slightly smaller than said piston and extending through said pressure chamber and into a receiving chamber formed in said housing, said guide being hollow to receive a relatively light spring tending to normally close the valve, a restricted passageway formed in said housing and connecting the main flow passageway with said pressure chamber, a relatively large passageway formed in said housing and connecting said pressure chamber with a pilot relief valve, a portion of said piston valve extending through said valve seat in the form of a tapered smooth contour whereby to dissipate the energy of the liquid and reduce chattering and vibration, and a conduit connecting the end of said tapering portion with said hollow portion in said guide.

7. A relief valve for hydraulic systems, comprising a T-shaped housing having an exhaust outlet and a main flow conduit having inlet and outlet, a main flow valve positioned within the main flow conduit for controlling the communication between said main flow conduit and the exhaust outlet, and a pilot relief valve in communication with the normal pressure fluid existing in the main flow conduit for controlling the actuation of said main flow valve and the relief of liquid through the exhaust outlet, a portion of said main flow valve cooperating with said exhaust outlet being shaped to dissipate liquid flowing past said main valve to reduce chattering and vibration, said main flow valve being hollow and provided with a conduit opening at the lower end thereof whereby to produce a partial vacuum within the hollow portion.

HARRY F. VICKERS.